UNITED STATES PATENT OFFICE 2,151,543

ACID WOOL DYESTUFF

Werner Zerweck and Heinrich Ritter, Frankfort-on-the-Main-Fechenheim, Germany, assignors to General Aniline Works, Inc., New York, N. Y., a corporation of Delaware No Drawing. Application December 9, 1937, Serial No. 178,882. In Germany December 14, 1936

4 Claims. (Cl. 260—509)

This invention relates to valuable new acid wool dyestuffs, more particularly to those of the general formula:

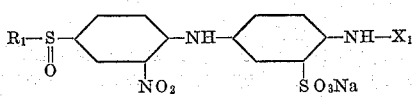

wherein $R_1$ stands for a member selected from the group consisting of lower alkyl, cyclohexyl and

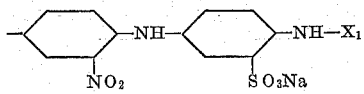

and $X_1$ stands for a member selected from the group consisting of cyclohexyl and aryl, aryl meaning a radicle of the benzene and naphthalene series.

The new dyestuffs are obtained by condensing nitro compounds of the general formula:

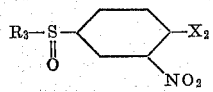

wherein $R_2$ stands for a member selected from the group consisting of lower alkyl, cyclohexyl and

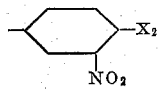

and $X_2$ stands for a member selected from the group consisting of halogen and alkoxy, with compounds of the general formula:

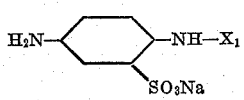

wherein $X_1$ has the above said signification.

The condensation may be carried out by heating the initial materials in the presence of acid-binding agents such as for example sodium acetate, sodium carbonate, calcium hydroxide, calcium carbonate and the like in an aqueous medium or in an organic diluent with or without the simultaneous addition of water either in an open vessel provided with a reflux condenser or in a closed vessel under pressure.

The new dyestuffs thus obtained dye animal fibers various shades of very good levelling power and fastness properties, partly of an excellent fastness to light, partly of an especially good fastness to washing, ironing, seawater and perspiration.

In order to further illustrate our invention the following examples are given, the parts being by weight and all temperatures in degrees centigrade.

Example 1

26.4 parts of 4-aminodiphenylamine-2-sulfonic acid, 22 parts of 1-chloro-2-nitrobenzene-4-methylsulfoxide and 28 parts of sodium acetate are mixed with about 200 parts of water and the mixture is heated to boiling for some hours in an apparatus provided with a reflux condenser and a stirrer. When cool the dyestuff formed of the formula:

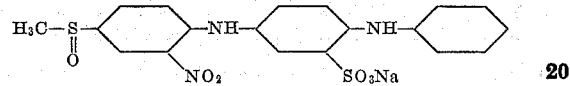

is precipitated by the addition of sodium chloride. It dyes wool from an acid bath brown shades of very good levelling power and fastness to light.

The same dyestuff is obtained by employing instead of 1-chloro-2-nitrobenzene-4-methylsulfoxide the corresponding amount of 1-methoxy-2-nitrobenzene-4-methylsulfoxide.

Similar brown dyestuffs of the same good properties are obtained by employing instead of 1-chloro-2-nitrobenzene-4-methylsulfoxide the corresponding amounts of 1-chloro-2-nitrobenzene-4-ethylsulfoxide, -4-propylsulfoxide, -4-cyclohexylsulfoxide and the like, or by replacing the 4-aminodiphenylamine-2-sulfonic acid by the corresponding amounts of 4'-methoxy-, 2'-methoxy-, 3', 4'-dimethoxy-, 4'-ethoxy-, 4'-methyl- or 4'-acetylamino-4-aminodiphenylamine-2-sulfonic acid or the like. Furthermore the said substitution products of the 4-aminodiphenylamine-2-sulfonic acid may be replaced by those of the 1-amino-4-cyclohexylaminobenzene-3-sulfonic acid, and the like whereby dyestuffs of similar properties are obtained.

The 1-chloro-2-nitrobenzene-4-methylsulfoxide employed for the above example and the homologous compounds may be prepared for example by nitrating 1-chlorobeneze-4-methylsulfoxide or the homologous compounds by means of one molecular proportion of concentrated nitric acid mixed with concentrated sulfuric acid.

Example 2

52.8 parts of 4-aminodiphenylamine-2-sulfonic acid, 36 parts of 4,4'-dichloro-3,3'-dinitrodiphenylsulfoxide and 22 parts of sodium carbonate are mixed with about 400 parts of water and the mixture is heated to boiling for some hours while stirring in an apparatus provided with a reflux condenser.

When cool the dyestuff formed of the formula:

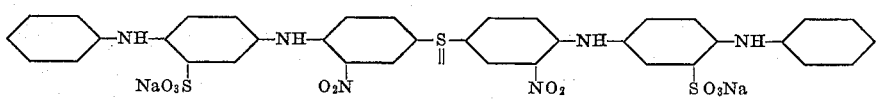

is precipitated by the addition of sodium chloride, filtered off, washed with a dilute sodium chloride solution and dried. It dyes wool from an acid bath yellowish brown shades of excellent fastness properties.

Analogous dyestuffs with the same good properties dyeing wool brown to dark-brown shades are obtained by employing instead of 4-aminodiphenylamine-2-sulfonic acid, 2'-methoxy-4-aminodiphenylamine-2-sulfonic acid or similar substitution derivatives of 4-aminodiphenylamine-2-sulfonic acid or those of 1-amino-4-cyclohexylaminobenzene-3-sulfonic acid, 1-amino-4-(2'-naphthylamino)-benzene-3-sulfonic acid and the like as described in example 1.

The 4,3'-dichloro-3,3'-dinitrodiphenylsulfoxide of 162° melting point may be prepared for example by nitrating 4,4'-dichlorodiphenylsulfoxide (which is obtained by acting with thionylchloride on monochlorobeneze according to the reaction of Friedel-Crafts) by means of concentrated nitric acid in concentrated sulfuric acid.

We claim:
1. The acid wool dyestuffs of the general formula:

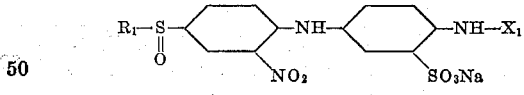

wherein $R_1$ stands for a member selected from the group consisting of lower alkyl, cyclohexyl and

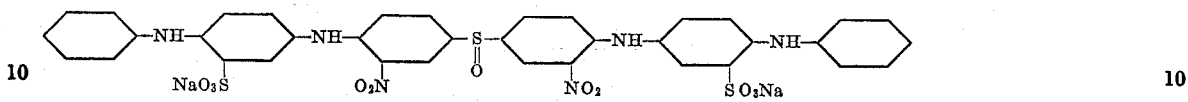

and $X_1$ stands for a member selected from the

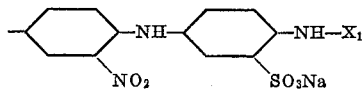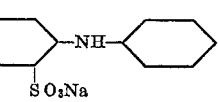

group consisting of cyclohexyl and aryl, aryl meaning a radicle of the benzene and naphthalene series, which dyestuffs dye animal fibers various shades of very good levelling power and fastness properties, partly of an excellent fastness to light, partly of an especially good fastness to washing, ironing, seawater and perspiration.

2. The dyestuff of the formula:

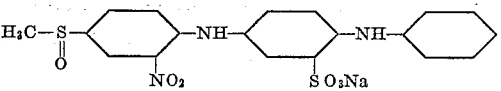

which dyestuff dyes wool from an acid bath brown shades of very good levelling power and fastness to light.

3. The dyestuff of the formula:

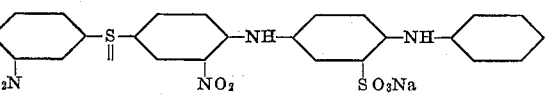

which dyestuff dyes wool from an acid bath yellowish brown shades of excellent fastness properties.

4. The dyestuff of the formula:

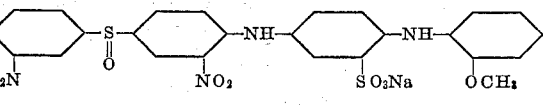

which dyestuff dyes wool from an acid bath brown shades of excellent fastness properties.

WERNER ZERWECK.
HEINRICH RITTER.